(12) United States Patent
Wei

(10) Patent No.: US 7,753,387 B2
(45) Date of Patent: Jul. 13, 2010

(54) BICYCLE STEPPING APPARATUS

(75) Inventor: Yi Pin Wei, Wufeng Township, Taichung County (TW)

(73) Assignee: Ho Luen Corp., Taichung County (TW)

( * ) Notice: Subject to any disclaimer, the term of this patent is extended or adjusted under 35 U.S.C. 154(b) by 550 days.

(21) Appl. No.: 11/580,298

(22) Filed: Oct. 13, 2006

(65) Prior Publication Data

US 2008/0088111 A1 Apr. 17, 2008

(51) Int. Cl.
*B62M 1/04* (2006.01)
*B62M 1/02* (2006.01)

(52) U.S. Cl. .................. 280/253; 280/252; 280/255; 280/258

(58) Field of Classification Search .............. 280/253, 280/252, 255, 258
See application file for complete search history.

(56) References Cited

U.S. PATENT DOCUMENTS

| | | | | |
|---|---|---|---|---|
| 4,533,152 A | * | 8/1985 | Clark | 280/251 |
| 5,207,119 A | * | 5/1993 | Garneau | 74/594.3 |
| 5,243,879 A | * | 9/1993 | Nagano | 74/594.2 |
| 5,540,111 A | * | 7/1996 | Barnett et al. | 74/30 |
| 5,690,345 A | * | 11/1997 | Kiser | 280/210 |
| 5,690,346 A | * | 11/1997 | Keskitalo | 280/234 |
| 6,129,646 A | * | 10/2000 | Farmos | 474/152 |
| 6,209,900 B1 | * | 4/2001 | Yoshizawa | 280/252 |
| 6,237,928 B1 | * | 5/2001 | Islas | 280/252 |
| 6,412,802 B1 | * | 7/2002 | Kugel et al. | 280/252 |
| 7,350,796 B2 | * | 4/2008 | Misevski | 280/259 |

* cited by examiner

*Primary Examiner*—Lesley Morris
*Assistant Examiner*—Marlon A Arce
(74) *Attorney, Agent, or Firm*—Guice Patents PLLC

(57) ABSTRACT

A bicycle stepping apparatus to increase the moment of force and save manual stepping labor has a stepping means located between a sprocket and a crank of a bicycle. The stepping means has a socket wrench which has a hub on one end with ratchet teeth formed thereon to house a flywheel. The flywheel has a gear engageable with the hub. The axis of the flywheel is coupled on the axle of the sprocket and fastened by a nut. The socket wrench has another end opposite to the hub that has an elongate sliding track formed on the bottom side to slidable hold a pair of first bearings of an auxiliary bar. The auxiliary bar has a steel ring on the bottom end with a pair of second bearings coupled on two sides to allow a shaft of a pedal to run through. The socket wrench can increase the moment of force to save manual stepping labor.

2 Claims, 6 Drawing Sheets

BICYCLE STEPPING APPARATUS

BACKGROUND OF THE INVENTION

1. Field of the Invention

The present invention relates to a bicycle stepping apparatus and particularly to an apparatus that can increase moment of force to save manual stepping labor during riding a bicycle.

2. Description of the Prior Art

The conventional bicycle transmission system mainly aims to drive the rear wheel by stepping along a circular path. Such an approach generates a smaller moment of force. As shown in FIG. 9, there is a crank 60 with one end coupling with a pedal 61 and another end coupling with an axle hole of a sprocket 62. When a rider steps the pedal 61, the crank 60 is driven to rotate the sprocket which in turns drive a chain to perform transmission. When the crank 60 rotates one turn (stepping along a circle), the sprocket 62 also rotates one turn. The moment of force being produced is small, and a lot of manual labor is needed to do stepping.

To improve the conventional stepping approach, the moment of force has to be changed (increase the moment of force) to reduce the manual stepping labor and effort.

SUMMARY OF THE INVENTION

The primary object of the present invention is to provide a bicycle stepping apparatus that is located between a sprocket and a crank and has a socket wrench id increase the moment of force to save manual stepping labor.

Another object of the invention is to provide a bicycle stepping apparatus that adopts reciprocal stepping instead of driving by stepping along a circle.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
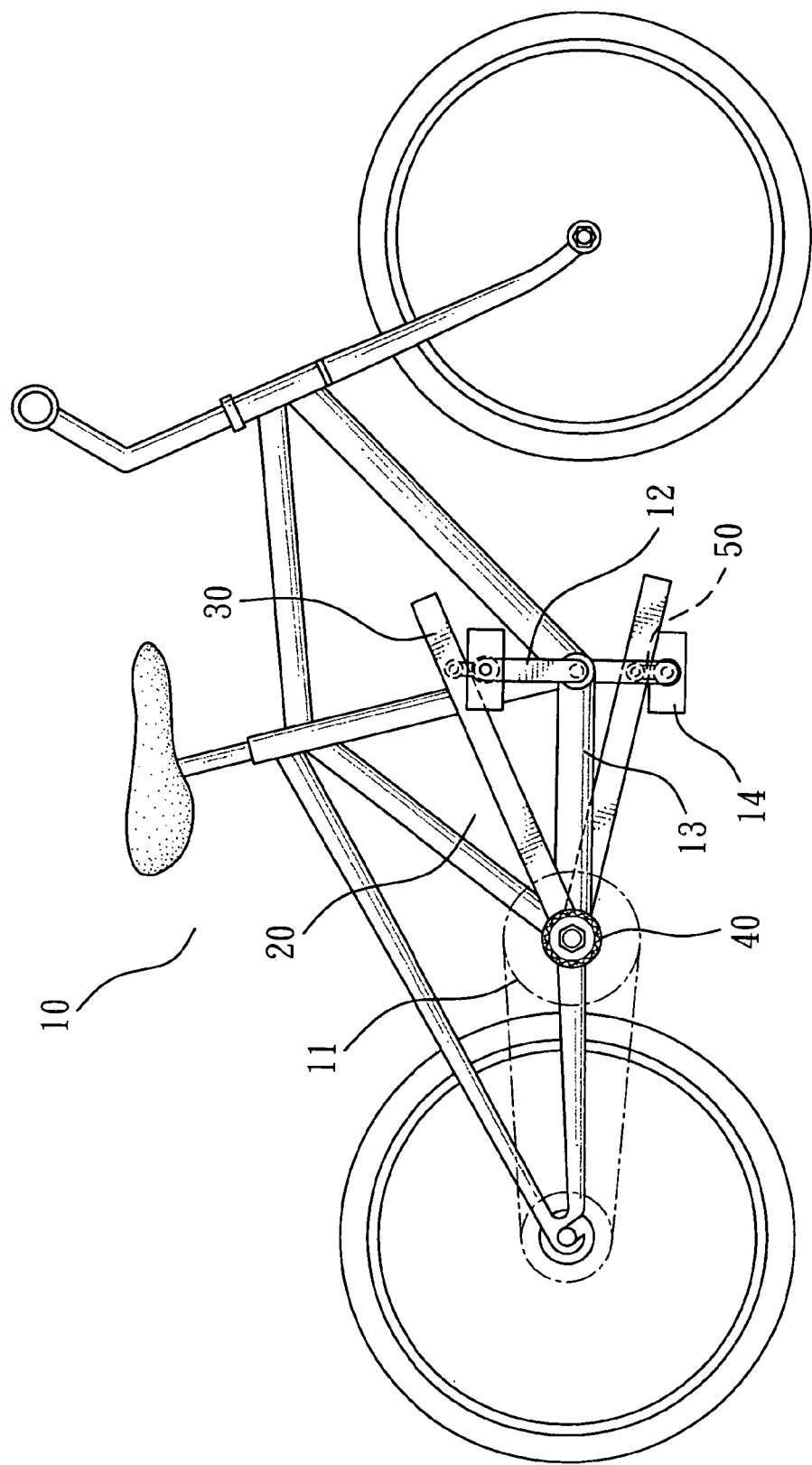
FIG. 1 is a schematic view of the invention.
Figure 2:
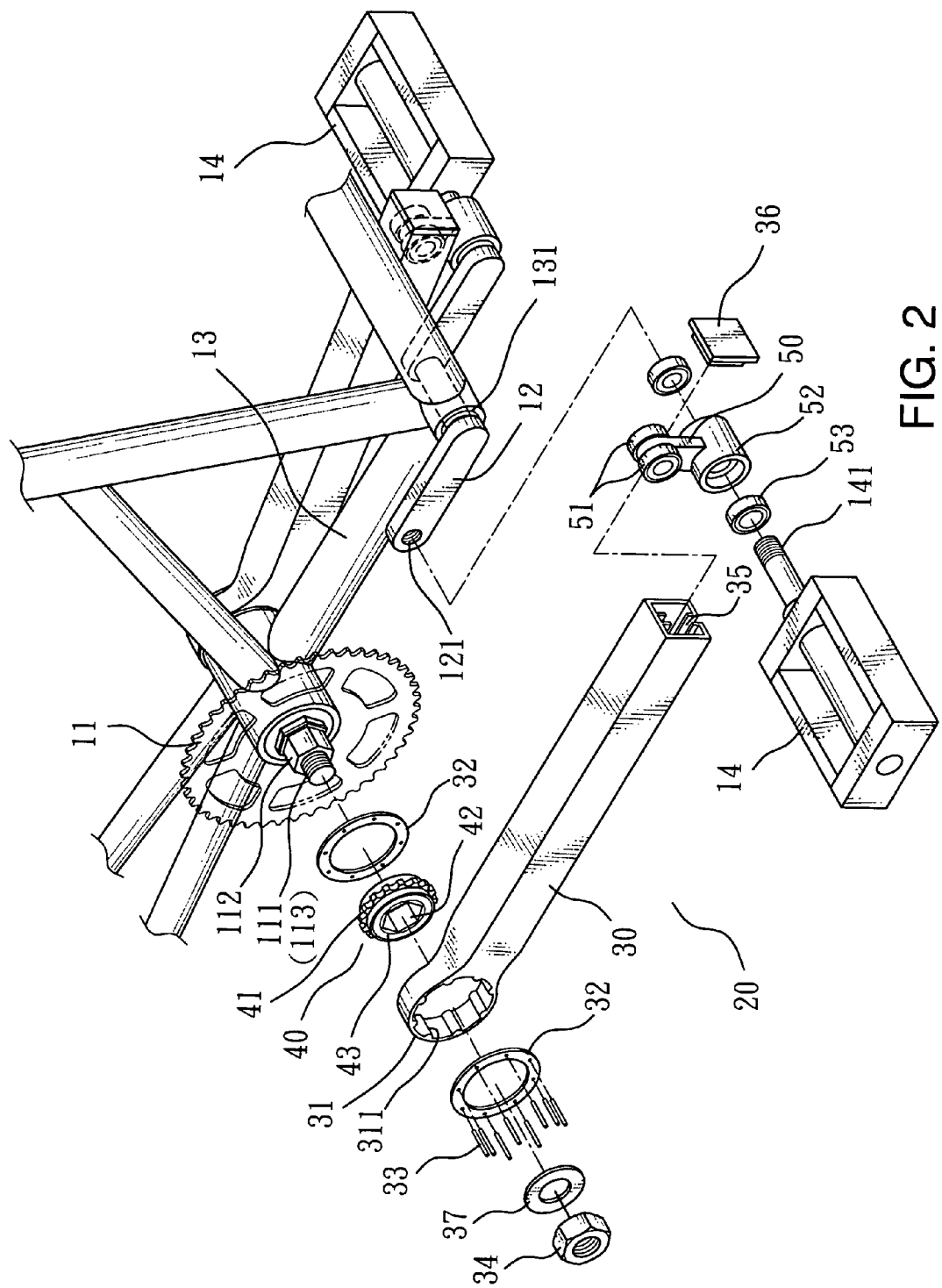
FIG. 2 is an exploded view of the invention.
Figure 3:
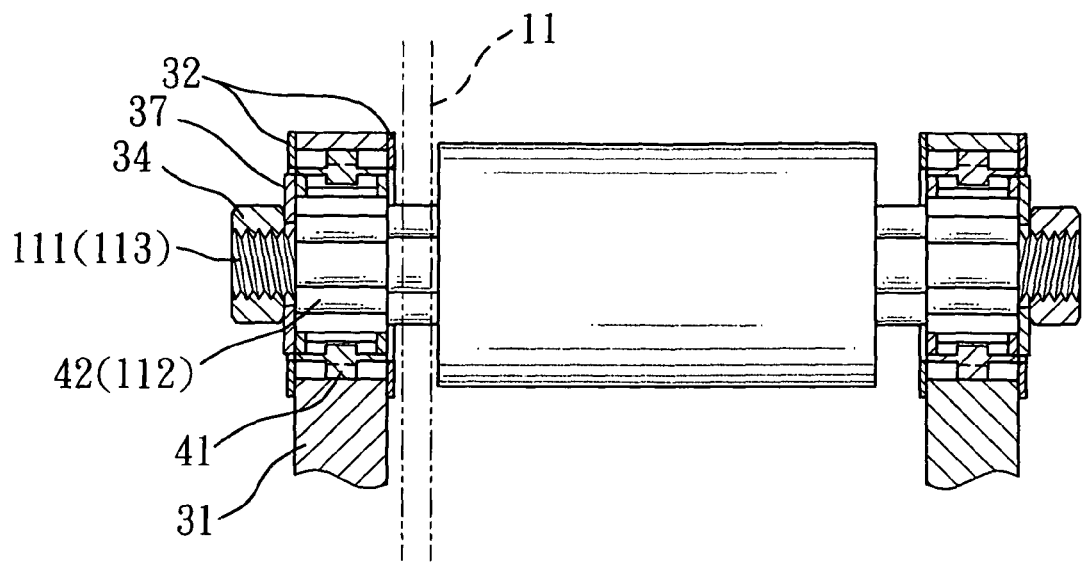
FIG. 3 is a sectional view of the invention.
Figure 4:
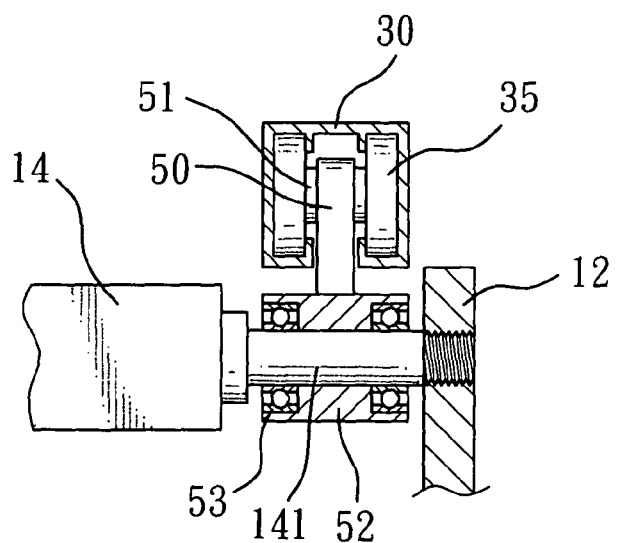
FIG. 4 is another sectional view of the invention.

Referring to FIGS. 1 through 4, the invention provides a stepping means 20 between a sprocket 11 and a crank 12 of a bicycle 10. The stepping means includes a socket wrench 30, a flywheel 40 and an auxiliary bar 50.

The sprocket 11 has axle 111 which has a hexagonal shaft 112 and a threaded portion 113 on a distal end to be coupled with the socket wrench 30. The bicycle 10 further has a bar 13 in front of the sprocket 11. The bar 13 has a hole 131 to pivotally couple with the crank 12 for rotating. The crank 12 has a screw hole 121 on one end to be screwed with a shaft 141 of a pedal 14.

The socket wrench 30 has a hub 31 on one end formed with ratchet teeth 311 to house a flywheel 40 (the flywheel of the bicycle in known in the art, details are omitted). The flywheel has a gear 41 engageable with the socket wrench 30. The hub 31 has two sides sealed respectively by a sealing plate 32 and fastened by rivets 33 to hold the flywheel 40 inside. The flywheel 40 has a hexagonal axis 42 to be coupled on the hexagonal shaft 112 of the sprocket 11. The socket wrench 30 is screwed on the threaded portion 113 of the axle 111 through a nut 34 with a washer 37 interposed between them. The socket wrench has another end opposite to the hub 31 that has an elongate sliding track 35 on the bottom side to hold first bearings 51 of the auxiliary bar 50. The sliding track 35 has a distal end sealed by a sealing lid 36.

The auxiliary bar 50 has a pair of the first bearings 51 on a upper end and a steel ring 52 on a lower end that is coupled with a pair of second bearings 53 on two sides to be run through by the shaft 141 of the pedal 14.

Figure 5:
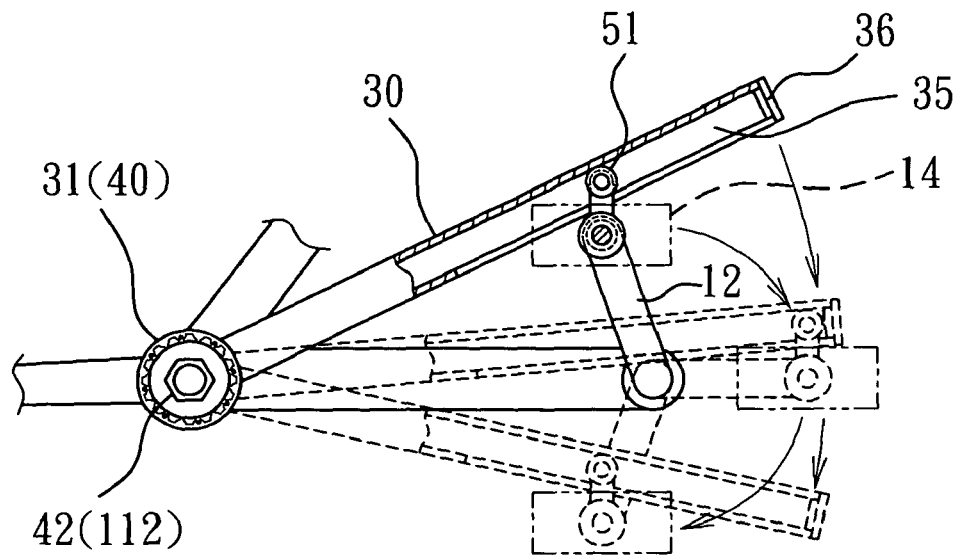
FIG. 5 is a schematic view of the invention in a downward stepping condition.
Figure 6:
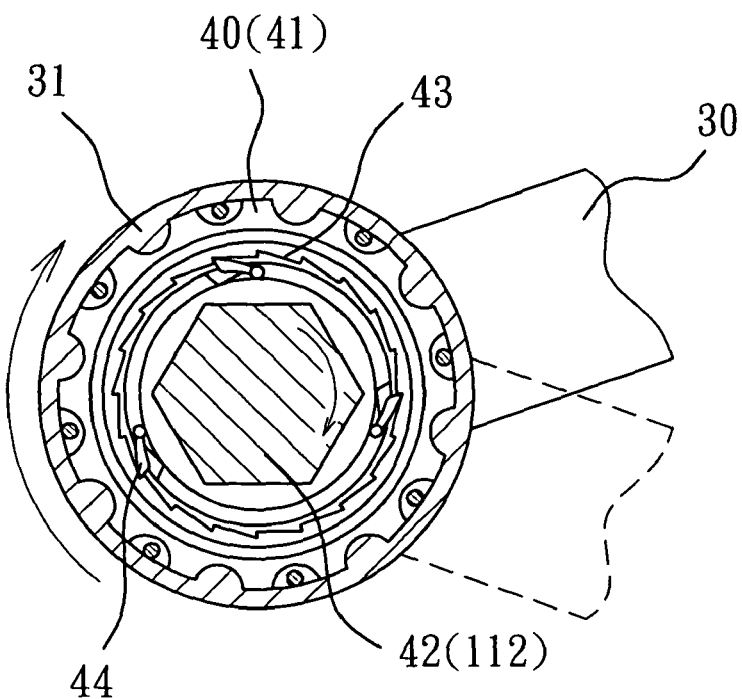
FIG. 6 is another schematic view of the invention in a downward stepping condition.
Figure 7:
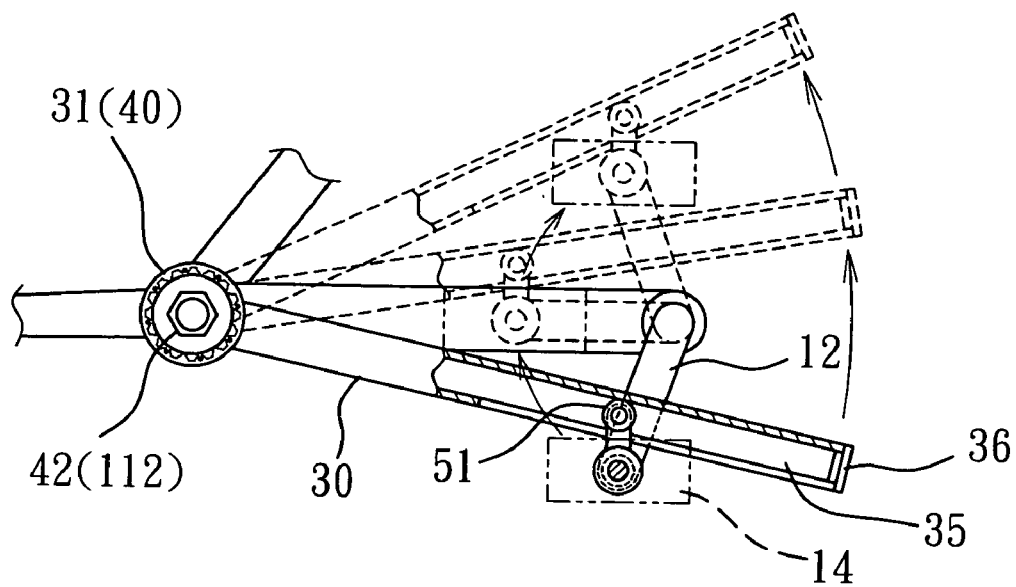
FIG. 7 is a schematic view of the invention showing the pedal in a returning upward condition.
Figure 8:
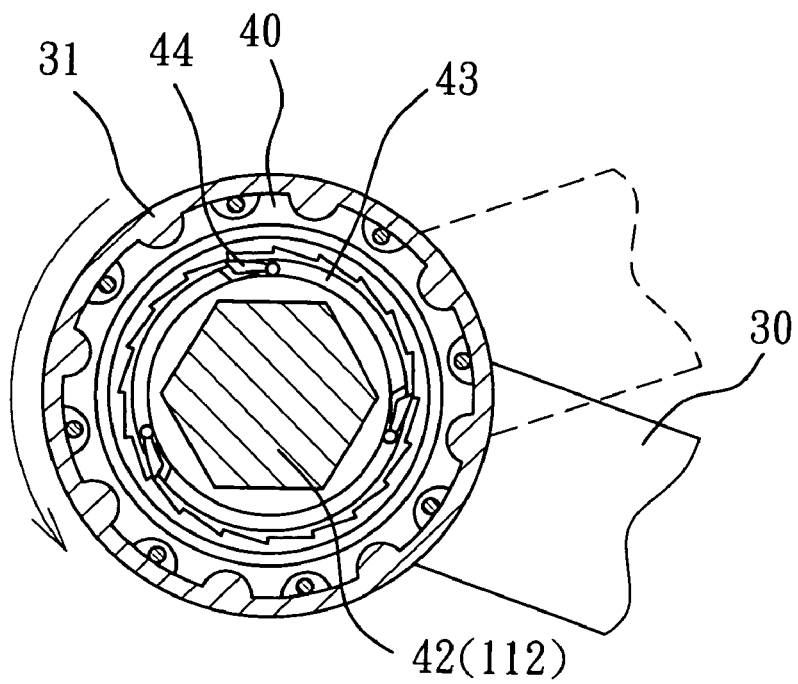
FIG. 8 is another schematic view of the invention showing the pedal in a returning upward condition.
Figure 9:
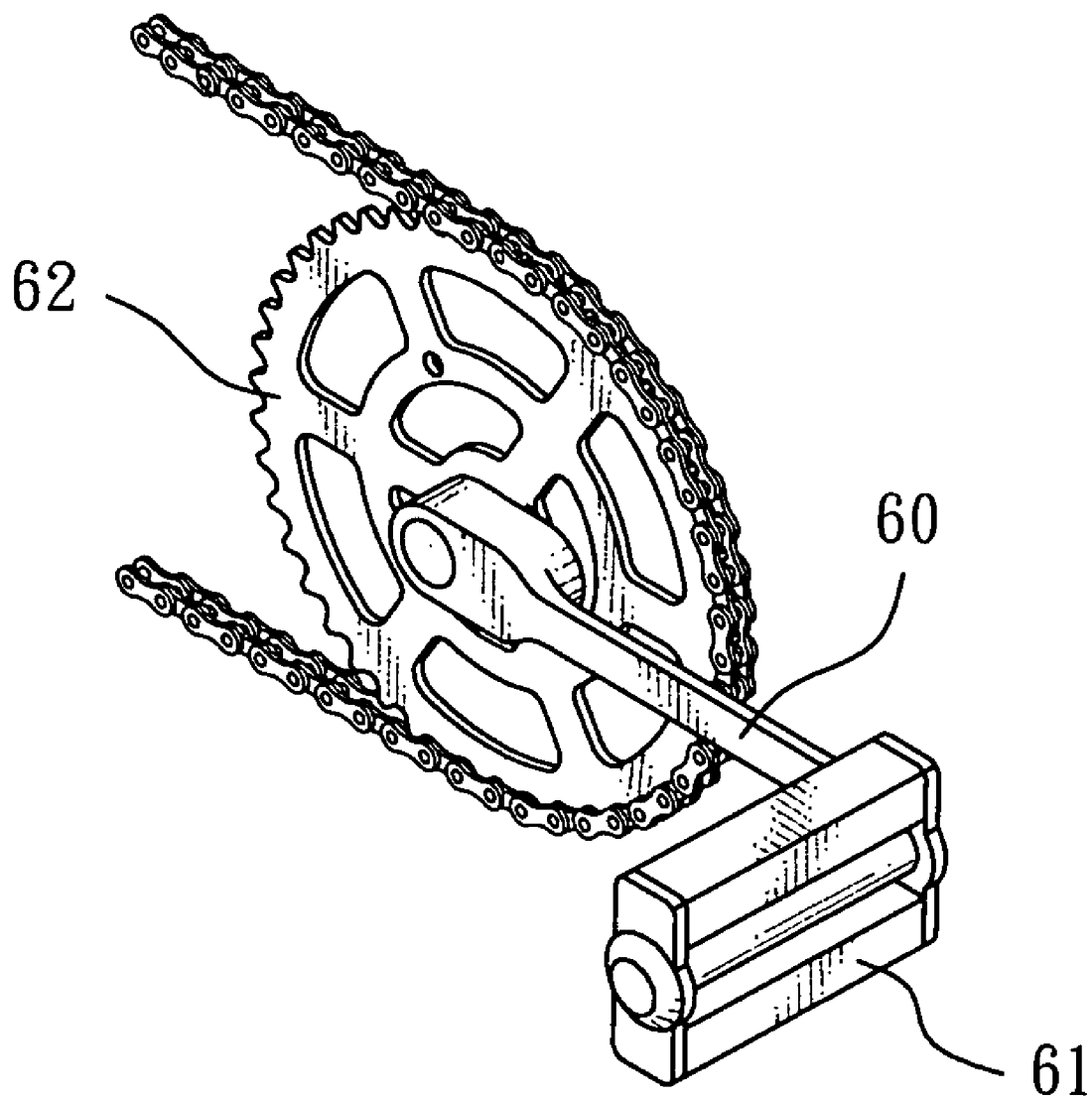
FIG. 9 is a fragmentary perspective view of the conventional transmission mechanism of a bicycle.

When in use (referring to FIG. 5), a rider steps the pedal 14 downwards to drive the socket wrench 30 to perform transmission. The gear 41 of the flywheel 40 is driven by the socket wrench 30 and rotates. A rotary disk 43 inside the flywheel 40 also is driven. Moreover, the rotary disk 43 is harnessed by a latch element 44, hence a moving force is generated such that the rotary disk 43 drives the axle 111 of the sprocket 11 to rotate (referring to FIG. 6). Therefore the sprocket 11 can drive the rear wheel of the bicycle to rotate. Meanwhile, the socket wrench 30 is moved downwards, the auxiliary bar 50 is moved due to sliding of the first bearings 51 at the upper end, hence the crank 12 is driven and the pedal 14 is moved to a lowest position (referring to FIG. 5). The crank on other side is moved in the opposite direction to move the pedal 14 to a highest position. Thus a up and down reciprocal movement is formed. When the pedal 14 is moved from the lowest position to the highest position (referring to FIGS. 7 and 8), the socket wrench 30 drives the gear 41 of the flywheel 40 to rotate. In that condition the rotary disk 43 is freed from the harness of the latch element 44, the gear 41 cannot drive the rotary disk 43, hence the rotary disk 43 rotates idly without driving the axle 111 of the sprocket 11, and the rear wheel is not driven.

By means of the construction set forth above, the socket wrench 30 can increase the moment of force to save manual labor during stepping. Moreover, the invention adopts the up and down reciprocal movement for stepping, the arm of force is longer and the moment of force is greater, thus can further save manual labor during stepping.

In short, the invention provides an improvement that is different from the conventional bicycle stepping approach. It is novel and can increase the moment of force, and save manual labor during riding the bicycle.

I claim:

1. A bicycle stepping apparatus having a stepping means located between a sprocket and a crank of a bicycle, comprising:

a bar of the bicycle is located in front of the sprocket;
the sprocket has an axle to couple with the stepping means;
a hole in the bar is configured to pivotally couple with the crank on each of two sides thereof for rotating the crank;
the crank has a screw hole on one end to be screwed by a shaft of a pedal;

a socket wrench of the stepping means has a hub on one end formed with wrench teeth to house a flywheel;

the flywheel has a gear engageable with the hub and an axis coupling on the axle and being fastened through a nut; and the socket wrench has an elongate sliding track on the bottom side of another end to hold a first bearing set of an auxiliary bar which has a steel ring on a bottom end that has two sides coupling respectively with a second bearing which is run through by the shaft of the pedal.

2. The bicycle stepping apparatus of claim 1, wherein the axle of the sprocket has a hexagonal shaft and a threaded portion on a distal end configured to be coupled with the flywheel, wherein the hub has two sides sealed respectively by a sealing plate through rivets and a washer located on an outer side of the sealing plate, the threaded portion being coupled with the nut to fasten the hub, and wherein the axis of the flywheel is hexagonal.

* * * * *